Aug. 28, 1923.

J. MILEY 1,466,028

MACHINE FOR BORING TIRES AND THE LIKE

Original Filed Aug. 4, 1921   3 Sheets-Sheet 1

Fig.1.

Inventor
J. Miley,
By J. J. Newton
Atty.

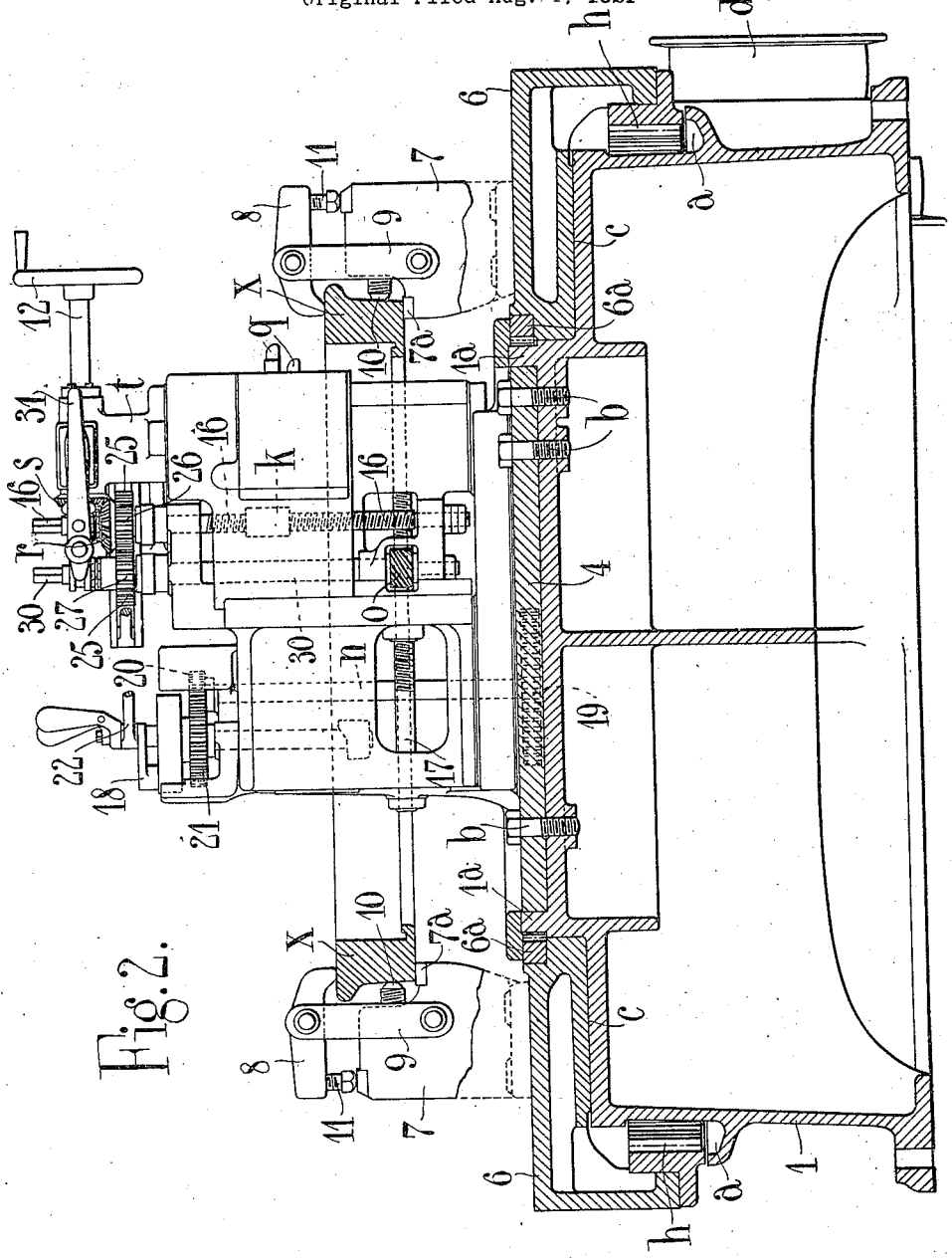

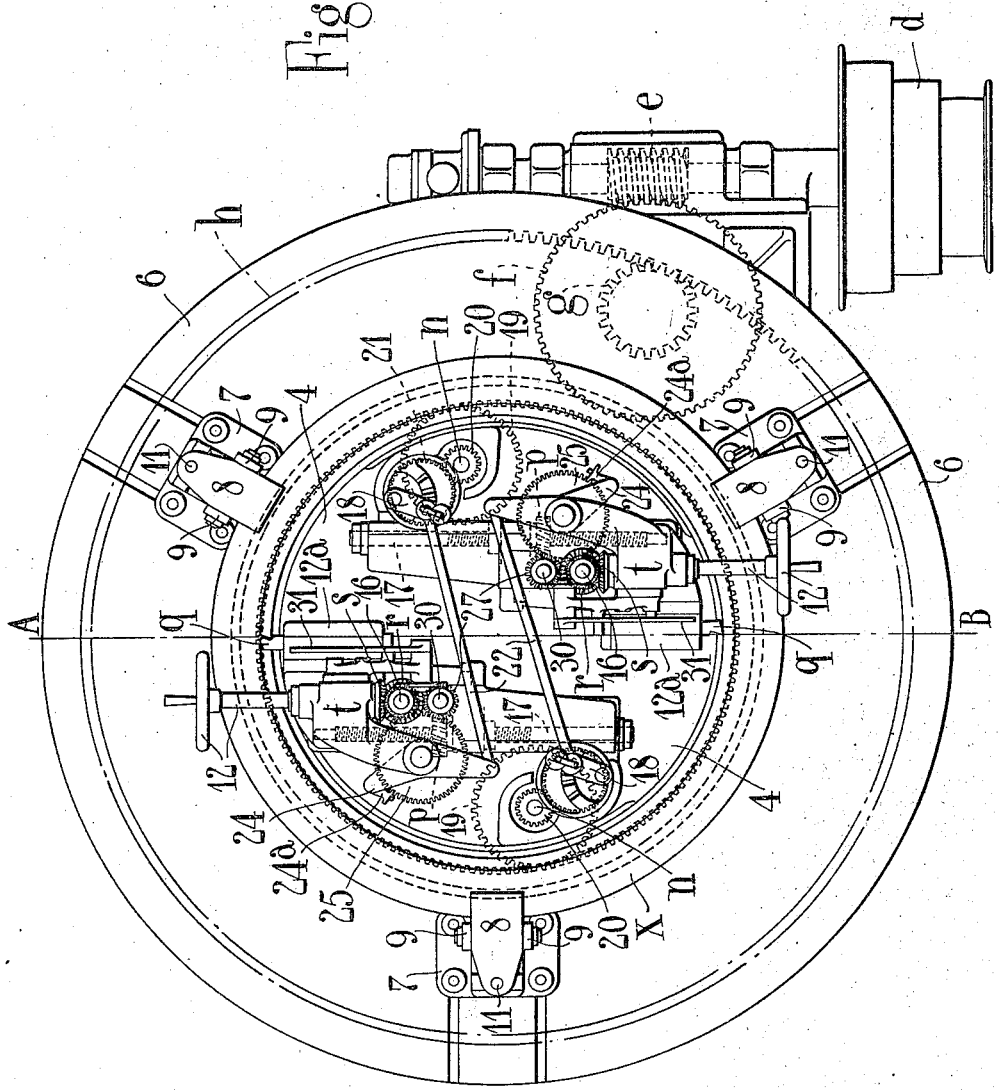

Patented Aug. 28, 1923.

1,466,028

UNITED STATES PATENT OFFICE.

JOHN MILEY, OF REDDISH, NEAR STOCKPORT, ENGLAND, ASSIGNOR TO CRAVEN BROTHERS (MANCHESTER) LIMITED, OF REDDISH, ENGLAND.

MACHINE FOR BORING TIRES AND THE LIKE.

Continuation of application Serial No. 489,664, filed August 4, 1921. This application filed April 8, 1922. Serial No. 550,715.

*To all whom it may concern:*

Be it known that I, JOHN MILEY, a subject of the King of Great Britain and Ireland, and residing at Vauxhall Works, Reddish, near Stockport, in the county of Lancaster, England, have invented certain new and useful Improvements in or Relating to Machines for Boring Tires and the like, of which the following is a specification.

This invention relates to vertical boring mills intended more particularly for boring the metal tires of railway wheels and the like, and this application is a continuation of my application Serial No. 489,664, filed August 4, 1921. In connection with such machine it has been proposed to mount the tool holders upon a fixed part of the machine and to cause a platform or table upon which the work is clamped to rotate about the tool holders.

The present invention has for its object to provide improved or simplified constructions of vertical boring mills of this kind.

The invention consists briefly in mounting the tool holders upon cross slides which are carried upon similar carriers or heads facing each other.

Another feature of this invention consists in effecting the tool feed motion by means of pinions which are rotated by an internally toothed wheel carried upon the rotating platform or table.

In the accompanying drawings:

Figure 1 is a side elevation of a tire boring machine embodying in one form the features of the present invention;

Figure 2 is an elevation thereof partly in section taken on the line A—B of Figure 3, and Figure 3 is a plan view.

Referring to the machine illustrated by way of example in these drawings 1 represents the base of the machine which is of circular form and well ribbed and is furnished with an annular turned surface $c$ for the reception of a revolving platform or table 6, which carries the tire $x$ to be bored. A circular trough $a$ is cast round the base 1 to receive spent lubricating oil.

An annular annulus $1^a$ is formed upon the machine body and within this annulus are two semi-circular bases 4 (of the tool carriers or heads 5) secured to the body by screws $b$.

The standards 7 carry clamps 8 pivotally mounted upon the upper ends of links 9 which at their lower ends are pivotally mounted upon the standards 7, the standards being suitably bolted or screwed to the platform 6.

The tire is thus capable of being held securely in position, as shown in Figures 1 and 2, being supported by ledges or rests $7^a$ centered by means of adjusting screws 10 and clamped by screws 11.

This fixing of the tire $x$ renders all clamping stresses self-contained and frees the tire and (or) the platform from distortion.

Rotation of the platform 6 is effected from a stepped pulley $d$ through the intermediary of a worm $e$, worm-wheel $f$, spur pinion $g$ and internally toothed wheel $h$, the latter being rigidly secured to the platform 6.

In addition to carrying the internally toothed wheel $h$, the platform 6 also carries an internally toothed wheel $6^a$ (Figure 2) which serves an important purpose, as will presently be explained.

The two tool carriers or heads 5, which are identical with each other, thus facilitating replacement, each comprise a semi-circular base 4 integral with a body upon which a vertical slide 13 and a horizontal slide 14 are carried as shown.

A tool post $12^a$ is detachably secured to each slide block 13 and serves to carry a gang of tools $q$. The tool posts and tools are preferably constructed in duplicate so that one gang of tools may be re-ground and set up in readiness in its box while another gang is in operation.

Traverse of each vertical slide block 13 is effected by means of a screw shaft 16 engaging a block $k$ rigid with the block 13. The shaft 16 is capable of being clutched to a pinion 26 by a clutch operated by a handle 31, the pinion 26 being continuously in mesh with a gear wheel 25. Intermittent partial rotation of the gear wheel 25 is effected by means of a bell crank lever 24 carrying a reversible ratchet pawl 24ª upon one arm and being pivotally connected to a link 22 at its other arm.

The link 22 serves to couple the lever 24 to a variable throw eccentric 18 which is adjusted to produce the desired rate of feed. The eccentric 18 is rigid with a pinion 21 meshing with a further pinion 20 carried upon a vertical shaft *n*.

At its lower end the shaft *n* carries a gear 19 which is in continuous mesh with the internally toothed wheel 6ª referred to above.

By this means it will be apparent that if the handle 31 be operated so as to lock the pinion 26 to the spindle 16, then the latter will be intermittently rotated by means of the internally toothed wheel 6ª and an intermittent vertical feed of the block 13 produced.

As regards the horizontal feeding of the slide 14 a pinion 27 is provided which is also constantly in mesh with pinion 25 and is capable of being connected to the vertical shaft 30 alternatively to the connection of the pinion 26 to the shaft 16 by means of the lever 31. The shaft 30 carries a helical gear *o* meshing with a corresponding gear *p* upon the screw shaft 17 which latter passes through a threaded portion of the horizontal feed block 14.

Thus it will be apparent that if the handle 31 be operated to lock the pinion 27 to the spindle 30, then the spindles 30 and 17 will be rotated intermittently and an intermittent horizontal feed produced.

A bevel wheel *r* rigid with the spur wheel 26 meshes with a bevel wheel *s* carried upon a spindle in the block *t* and a detachable short shaft and hand wheel 12 are provided. By this means the spur wheel 26 may be rotated by hand and consequently horizontal and vertical feeding of the tool effected alternatively. The short shaft and hand wheel are removed to enable the work to be set up and are then replaced.

It will be observed that the drive for the automatic feeding mechanism of each tool carrier is incorporated with the other tool carrier and that the whole of the feed mechanism is situate outside the main body 1 of the machine where it is readily accessible.

Either tool carrier may be removed complete with its feed mechanism by merely uncoupling the links 22, the remainder of the machine remaining undisturbed.

Having now described my invention, what I claim as new and desire to secure by Letters Patent is:—

1. A machine for boring tires or the like, including in combination a stationary base, a tool carrier detachably mounted thereon, a similar tool carrier detachably mounted on said base in a position facing said first-mentioned tool carrier, a hollow circular platform having an internal gear rotatably carried upon and surrounding said base, means for clamping tires or the like to said platform, means for rotating said platform, a tool slidably supported upon each of said tool carriers and a gear wheel meshing with said internal gear and having connections for operating said tools relatively to their respective carriers.

2. A machine for boring tires or the like, including in combination a stationary base, a tool carrier detachably mounted thereon, a similar tool carrier detachably mounted on said base in a position facing said first-mentioned tool carrier, a platform rotatably carried upon and surrounding said base, means for clamping tires or the like to said platform, means for rotating said platform, a toothed tool feed driving wheel mounted upon and rotated by said platform, tool feed driving mechanism supported by one of said tool carriers and incorporating a toothed wheel continuously in mesh with said feed driving wheel, independent tool feed mechanism supported by the other of said tool carriers and mechanically connected to said feed driving mechanism.

3. A machine for boring tires or the like, including in combination, a stationary base, a tool carrier detachably mounted thereon, a similar tool carrier detachably mounted on said base in a position facing said first-mentioned tool carrier, a platform rotatably carried upon and surrounding said base, means for clamping tires or the like to said platform, means for rotating said platform, a horizontally slidable member upon one of said carriers, a vertically slidable member upon said horizontally slidable member, means for effecting alternatively sliding of either of said slidable members, said last-named means being driven by feed drive mechanism carried by the other of said carriers, and a toothed wheel rigidly mounted upon said platform constituting driving means for said feed drive mechanism.

4. A machine for boring tires or the like, including in combination a stationary base, a tool carrier detachably mounted thereon, a similar tool carrier detachably mounted on said base in a position facing said first-mentioned tool carrier, a platform rotatably carried upon and surrounding said base, means for clamping tires or the like to said platform, means for rotating said platform, a toothed tool feed driving wheel mounted upon and rotated by said platform, a vertical spindle carried in one of said tool carriers, a pinion on the lower end of said spindle continuously meshing with said toothed tool feed driving wheel, a pinion on the upper end of said spindle, a further pinion meshing therewith, a variable throw eccentric member rigid with said further pinion, vertical tool feed mechanism and horizontal tool feed mechanism carried upon the other of said carriers, a toothed feed wheel and a ratchet feed arm for operating said mechanisms alternatively at will and a mechanical connection between said ratchet feed arm and said variable throw eccentric.

5. A machine for boring tires or the like including a base, a platform, one of these parts being encircled by the other and rotatable one around the other and carrying an internal gear, a tool carrier mounted on one of these parts, and tool operating means having a gear intermeshing with said internal gear for moving the tools.

In testimony whereof I have signed my name to this specification.

JOHN MILEY.